US010671975B2

(12) United States Patent
Gupta et al.

(10) Patent No.: US 10,671,975 B2
(45) Date of Patent: Jun. 2, 2020

(54) SMART STREAMING OF DATA BETWEEN EXTERNAL SYSTEMS AND SERVICE PROVIDERS IN AN ON-DEMAND ENVIRONMENT

(71) Applicant: salesforce.com, inc., San Francisco, CA (US)

(72) Inventors: Anjani Gupta, Redwood City, CA (US); William Victor Gray, Kitchener (CA); Shaahin Mehdinezhad Rushan, Dublin, CA (US); Yogesh Patel, Dublin, CA (US); Kshama Thacker, San Mateo, CA (US); Shreedhar Sundaram, San Mateo, CA (US); Mahalaxmi Sanathkumar, San Francisco, CA (US); Rajkumar Pellakuru, San Jose, CA (US); William Edward Hackett, Vallejo, CA (US)

(73) Assignee: salesforce.com, inc., San Francisco, CA (US)

( * ) Notice: Subject to any disclaimer, the term of this patent is extended or adjusted under 35 U.S.C. 154(b) by 21 days.

(21) Appl. No.: 15/866,929

(22) Filed: Jan. 10, 2018

(65) Prior Publication Data
US 2019/0213552 A1    Jul. 11, 2019

(51) Int. Cl.
*G06F 16/2455*    (2019.01)
*G06Q 10/10*    (2012.01)
*H04L 29/06*    (2006.01)

(52) U.S. Cl.
CPC ..... *G06Q 10/103* (2013.01); *G06F 16/24568* (2019.01); *H04L 65/4023* (2013.01)

(58) Field of Classification Search
CPC ............ G06Q 10/103; G06F 16/24568; H04L 65/4023
USPC ........................................................ 709/206
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |

(Continued)

Primary Examiner — Glenford J Madamba
(74) Attorney, Agent, or Firm — Jaffery, Watson, Mendonsa & Hamilton, LLP

(57) ABSTRACT

In accordance with embodiments, there are provided mechanisms and methods for facilitating smart streaming of data between external systems and service providers in an on-demand services environment according to one embodiment. In one embodiment and by way of example, a method comprises splitting, by a streaming server computing device ("streaming device"), a file including messages associated with multiple tenants in a multitenant environment based on growth of the file over a time-period. The method may further include grouping, by the streaming device, the messages into multiple files based on intelligence fields associated with one or more of the messages and the tenants, where each file of the multiple files corresponds to a tenant of the multiple tenants. The method may further include uploading, by the streaming device, the multiple files to a database device associated with a service provider and coupled to the streaming server device.

15 Claims, 7 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0128717 A1* | 5/2010 | Pickering ............ G06Q 30/016 370/352 |
| 2015/0019480 A1* | 1/2015 | Maquaire ............. G06F 16/252 707/609 |
| 2017/0242891 A1* | 8/2017 | Doan ..................... G06F 7/32 |
| 2018/0004818 A1* | 1/2018 | Sarma ............... G06F 16/2477 |

* cited by examiner

SMART STREAMING OF DATA BETWEEN EXTERNAL SYSTEMS AND SERVICE PROVIDERS IN AN ON-DEMAND ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitating smart streaming of data between external systems and service providers in an on-demand services environment.

BACKGROUND

Conventional techniques for communication of messages between external systems and service providers in multi-tenant environments often fail to scale for number or organizational growth of tenants, which often leads to inefficiencies like duplication of messages, breach of call limits, etc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
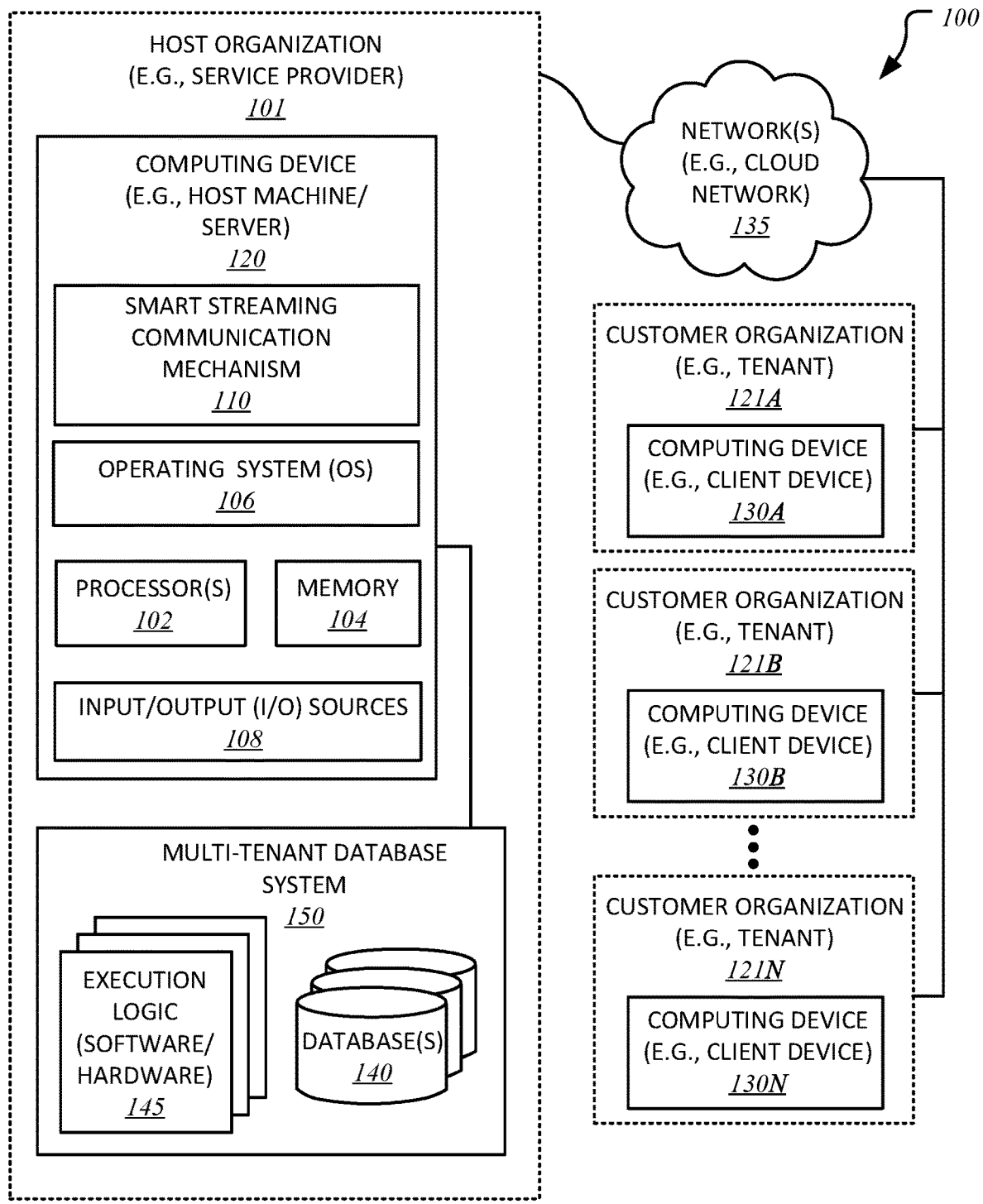
FIG. 1 illustrates a system having a computing device employing a smart streaming communication mechanism according to one embodiment.

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for organized and controlled communication of intelligence fields-based messages between external systems (e.g., SalesforceIQ® or simply SIQ) and service providers (e.g., Salesforce.com® or simply Salesforce) such that the communication is accounted for time, content, and quantity. In one embodiment, as will be further described in this document, a timer is introduced to work with content-based criteria to periodically monitor the data to point out and eliminate any excess or irrelevant data that is determined to be wasting time, while predetermined quantity parameters are set to keep any application programming interface (API) call limits under the allocated ceiling.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a smart streaming communication mechanism ("streaming mechanism") 110 according to one embodiment. In one embodiment, streaming mechanism 110 provides for time-ordered, content-aware, and ceiling-controlled streaming of files having messages or records between external system 250 (e.g., SIQ) of FIG. 2 and computing device 120. As illustrated, in one embodiment, computing device 120, being part of host organization 101 (e.g., service provider, such as Salesforce.com®), represents or includes a server computer acting as a host machine for employing streaming mechanism 110 for facilitating smart deployment of metadata packages in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of streaming mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™code, JavaScript™, jQuery™, Developerforce™, Visualforce™, Service Cloud Console Integration Toolkit ("Integration Toolkit" or "Toolkit"), Platform on a Service™("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
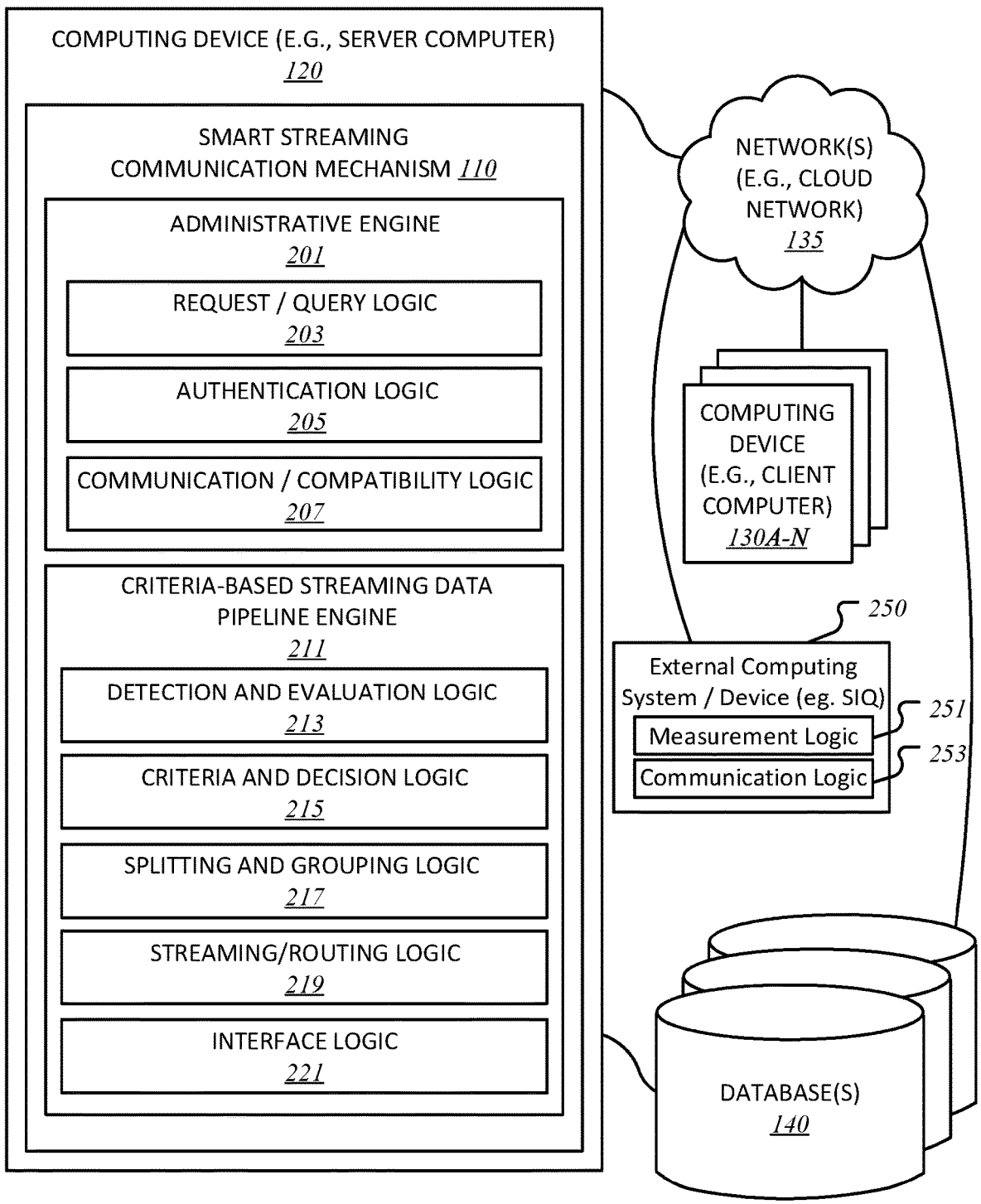
FIG. 2 illustrates a smart streaming communication mechanism according to one embodiment.

FIG. 2 illustrates a smart streaming communication mechanism 110 of FIG. 1 according to one embodiment. In one embodiment, streaming mechanism 110 provides for time-ordered, content-aware, and ceiling-controlled streaming of messages or records between external system 250 and computing device 120, where streaming mechanism 110 includes any number and type of components, such as administration engine 201 having (without limitation): request/query logic 203; authentication logic 205; and communication/compatibility logic 207. Similarly, streaming mechanism 110 may further include criteria-based streaming data pipeline engine ("pipeline engine") 211 including (without limitation): detection and evaluation logic 213; criteria and decision logic 215; splitting and grouping logic 217; streaming/routing logic 219; and interface logic 221.

In one embodiment, computing device 120 may serve as a service provider core (e.g., Salesforce.com® core) for hosting and maintaining streaming mechanism 110 and be in communication with one or more database(s) 140, one or more client computer(s) 130A-N, over one or more network(s) 135, and any number and type of dedicated nodes. In one embodiment, one or more database(s) 140 may be used to host, hold, or store data including intelligence fields, time and capacity criteria, API call limits, messages and queries, tenant and organization data, etc.

As illustrated, computing device 120 (acting as Salesforce.com® core or streaming server device), also referred to as "streaming server" throughout this document, is further in communication with external computing system/device ("external system") 250 serving as an external device for performing certain computational tasks, such as measuring intelligence fields relating to the messages and their corresponding tenants. For example, external system 250 is shown as having measurement logic 251 for computing intelligence fields that are then communicated with computing device 120 over network(s) 135 using communication logic 253 and communication/compatibility logic 207.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "intelligence fields", "streamer", "streamer server device", "pipeline", "API", "API call or call limit", "time criteria", "capacity criteria", "duplication", "evaluating", "analyzing", "profiling", "selecting", "deciding", "routing", "streaming", "generating", "maintaining", "queuing", "pipelining", "customizing", "testing", "updating", "upgrading", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client device(s) 130A-N, code execution requests, and so forth.

In one embodiment, computing device 120 may implement request/query logic 203 to serve as a request/query interface via a web server or as a stand-alone interface to receive requests packets or other requests from the client device(s) 130A-N. The request interface may further support the return of response packets or other replies and responses in an outgoing direction from computing device 120 to one or more client device(s) 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device(s) 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices) 130A-N, over one or more communication mediums, such as network(s) 140.

As mentioned above, conventional techniques fail to account for usage limitations associated with tenants, where messages, such as intelligence fields-based message, are communicated between systems without appropriately or sufficiently scaling for the growth in the number of and organizational set of tenants. For example, conventional techniques often allow for duplication of messages, breaching of API call ceilings allocated to tenants, etc.

Embodiments provide for a novel technique, as facilitated by streaming mechanism 110, for managing messages (e.g., intelligence fields-based messages) between external system 250 and streaming server 120 in terms of time, content, and quantity associated with messages. In one embodiment, criteria and decision logic 215 is used to generate and apply predetermined criteria to allow for continuous or periodic monitoring of messages, such as every few seconds, to facilitate detection and evaluation logic 213 to systematically read and analyze data from files within folders associated with various tenants.

For example, upon continuous or periodic monitoring of messages, criteria and decision logic 215 continues to work with and facilitate detection and evaluation logic 213 to detect and evaluate messages regarded as duplicates or unnecessary so that such message may then be removed by criteria and decision logic 215 from being part of further communication.

Similarly, it is contemplated that the in multi-tenant environments, tenants or organizations are encouraged to work their specified allocation of resources, such as queue space, number of messages, size of messages, job types, API calls, memory accesses, etc. However, with conventional techniques, it is observed that many tenants not only maximize their resources, but are often in violation of exceeding their allocated limits which, in turn, victimizes other tenants and puts undue burden on resources offered by their service provider.

In one embodiment, criteria and decision logic 215 is further to introduce predetermined parameters to place a check on how many API calls a tenant makes. For example, each tenant in a multi-tenant environment is like assigned a number of API calls and any more than that would be regarded as breaching the API call allocation ceiling and, as aforementioned, could victimize other tenants who are within their limits, which can place undue burden on the service provider and the available resources.

In one embodiment, by setting the predetermined parameters for API calls, as facilitated by criteria and decision logic 215, all API calls by tenants are detected, monitored, and analyzed by detection and evaluation logic 213. As aforementioned, criteria and decision logic 215 is used to ensure tenants do not reach their API limits. For example, in one embodiment, upon detection of a growing file by detection and evaluation logic 213, splitting and grouping logic 217 is triggered to split the file into multiple files before there is any chance of any of the tenants reaching their API call limits. Similarly, in another embodiment, if any duplicates messages are present in the file as detected by detection and evaluation logic 213, criteria and decision logic 215 is then triggered to be proactive, as opposed to being reactive, by initiating a preventive measure of de-duplication process to eliminate the duplicates, such as through merging of identical messages, to free up the space in the file. This novel technique allows for the preventive measure to keep the system and its tenants from reaching their API call limits as opposed to reacting upon reaching such limits.

Further, in one embodiment, if a file grows too big, none of the messages are to be removed from the file; instead, splitting and grouping logic 217 is triggered to create a new file, while the existing file is split across multiple corresponding tenant folders. However, as part of a SOAP request by an individual tenant, extra messages may be removed as facilitated by criteria and decision logic 215.

However, in some embodiments, when a file having messages associated with multiple tenants gets too big over time, as detected by detection and evaluation logic 213, splitting and grouping logic 217 is then triggered to split the file having messages associated with multiple tenants into multiple files based on one or more of time, content, and capacity criteria as set forth by criteria and decision logic 215. In one embodiment, each of the multiple files corresponds to or contains a group of messages corresponding to a tenant. In other words, upon splitting the file, splitting and grouping logic 217 is then used to group the message into multiple groups based on intelligence fields associated with those messages such that each group of multiple groups corresponds to a tenant of multiple tenants in a multi-tenant environment. Each group of messages is placed in a file corresponding to a tenant.

For example, each message is detected or consumed in a data pipeline, such as a novel streamer pipeline, and then written to a file, while this file can keep growing as new messages are added to it. Further, for example, a file containing messages associated with multiple tenants can grow to be someone complex since for each message and/or tenant, specific intelligence fields as generated by measurement logic 251 and communicated through communication logic 253. In one embodiment, if the file grows up to expiration of a predetermined time period, T, or having reached a predetermined number of records, X, splitting and grouping logic 217 is triggered to split the file into multiple files based on intelligence fields, where each newly-generated file includes messages corresponding to a tenant based on the corresponding intelligence fields. In one embodiment, T and X are configurable using criteria and decision logic 215 as these two values, such as T and X, can be used to prevent message files from growing too big, such as when there is a large burst of records set from external system 250 (e.g., SIQ) over the streaming pipeline as offered through streaming mechanism 110.

Further, for each tenant, a directory may be generated and stored at database(s)140 as facilitated by streaming/routing logic 219, where the directory may include files having messages or records relating to the corresponding tenants. For example, directories are stored as part of a file system at database(s) 140, where there is at least one directory corresponding to each tenant and includes files having records associated with the corresponding tenant. In one embodiment, splitting and grouping logic 213 is used to read messages or records from such files associated with tenants through their tenant identification ("tenant ID") or organization identification ("organization ID") and further, messages are written in files as part of folders that are further part of their directories as facilitated by splitting and grouping logic 213. This process continues until each message is written in its corresponding file.

In one embodiment, once all messages are processed and written to their files and assigned to specific folders in their respective directories, detection and evaluation logic 213 is used to scan all record IDs associated with all records to detect any duplicate records. In one embodiment, criteria and decision logic 215 is then used to eliminate the duplication records by either merging them with their duplicates or simply removing them from the files. In either embodiment, duplicate records are eliminated, resulting in a significant reduction in the overall number of records that are to be communicated to the service provider. As aforementioned, the remaining duplicate-free messages or records are then uploaded or communicated on to the service provider's system through streaming server 120 through SOAP calls.

Further, as illustrated with reference to FIG. 3, in one embodiment, pipeline engine 211 of streaming mechanism 110 provides for a streaming data pipeline for streaming of data, including files having messages, from one end to another, such as between streaming server 120 associated with a service provider (e.g., Salesforce.com) and external system 250 associated with an external or third-party entity (e.g., SalesforceIQ). This novel streaming data pipeline provides for ingestion and transformation of large amounts of data (e.g., messages, records, etc.) to be able to apply machine learning techniques and arrive at useful metrics for customers, such as tenants.

In one embodiment, the novel streaming data pipeline, as facilitated by pipeline engine 211, is provided through a cloud platform (e.g., web services cloud, such as Amazon® Web Services (AWS), etc.) and may be an elastic bean instance (e.g., virtual machine). Since any data stored on virtual machines may not be regarded as persistent and machine states themselves may be considered transient and thus when a virtual machine dies, in one embodiment, a new virtual machine is added to the relevant cluster of virtual machines at any given point in time as facilitated by criteria and decision logic 215.

Further, detection and evaluation logic 213 is further used to listen to any changes occurring across the relationship between the service provider and its tenants though a customer relationship management (CRM)-based technology and if it detects any changes, streaming/routing logic 219 may then be triggered to send these changes across the streaming data pipeline to external system 250 without manipulating the data.

As previously described, in one embodiment, measurement logic 251 of external system 250 associated with an external entity (e.g., SIQ) computes intelligence fields using its distributed infrastructure that includes or has access to (without limitations) storm topologies, elastic searches, and scalability and high availability databases (e.g., Apache® Cassandra™), etc. Once intelligence fields are computed by measurement logic 251, they are then communicated back to streaming mechanism 110 at streaming server 120 through one or more distributed streaming platforms (e.g., Apache® Kafka™) over network(s) 135 (e.g., cloud network, Internet, etc.) as facilitated by communication logic 253 and/or communication/compatibility logic 207.

On the other end, streaming data pipeline, as facilitated by pipeline engine 211, being part of cloud web services, listens to the one or more distributed streaming platforms and receives the intelligence fields that are then written back to the service provider through streaming mechanism 110. In one embodiment, these intelligence fields and/or any messages or files including messages are communicated on to service provider through streaming server 120 using messaging and transmitting protocol-based calls, such as Simple Object Access Protocol (SOAP) calls. SOAP provides for a protocol specification for exchanging structured information for implementing web services, etc. It is contemplated, however, that embodiments are not limited to SOAP or any other such protocol or standard.

Further, in one embodiment, interface logic 221 may be used to facilitate interfacing between various components of streaming mechanism 110 as well as with other components and/or devices, such as external system 250, client computing devices 130A-N, database(s) 140, and/or the like. For example, interface logic 221 may be used to provide user interface(s) at computing device(s) 130A-N associated with tenants, where, for example, a user associated with a tenant may have access a corresponding one of computing device(s) 130A-N through a user interface. Similarly, in one embodiment, interface logic 221 may be used to facilitate and support user interface(s) at one or more computing device(s) 130A-N so that any queries, job requests, messages, etc., may be placed by users through such user interface(s) at computing device(s) 130A-N. It is contemplated that a user interface is not limited in form or type, such as a user interface may include (without limitations): a web browser, Graphical User Interface (GUI), software application-based interface, etc., and further, an application programming interface (API), a Representational State Transfer (REST) or RESTful API, and/or the like.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from streaming mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

Figure 3:
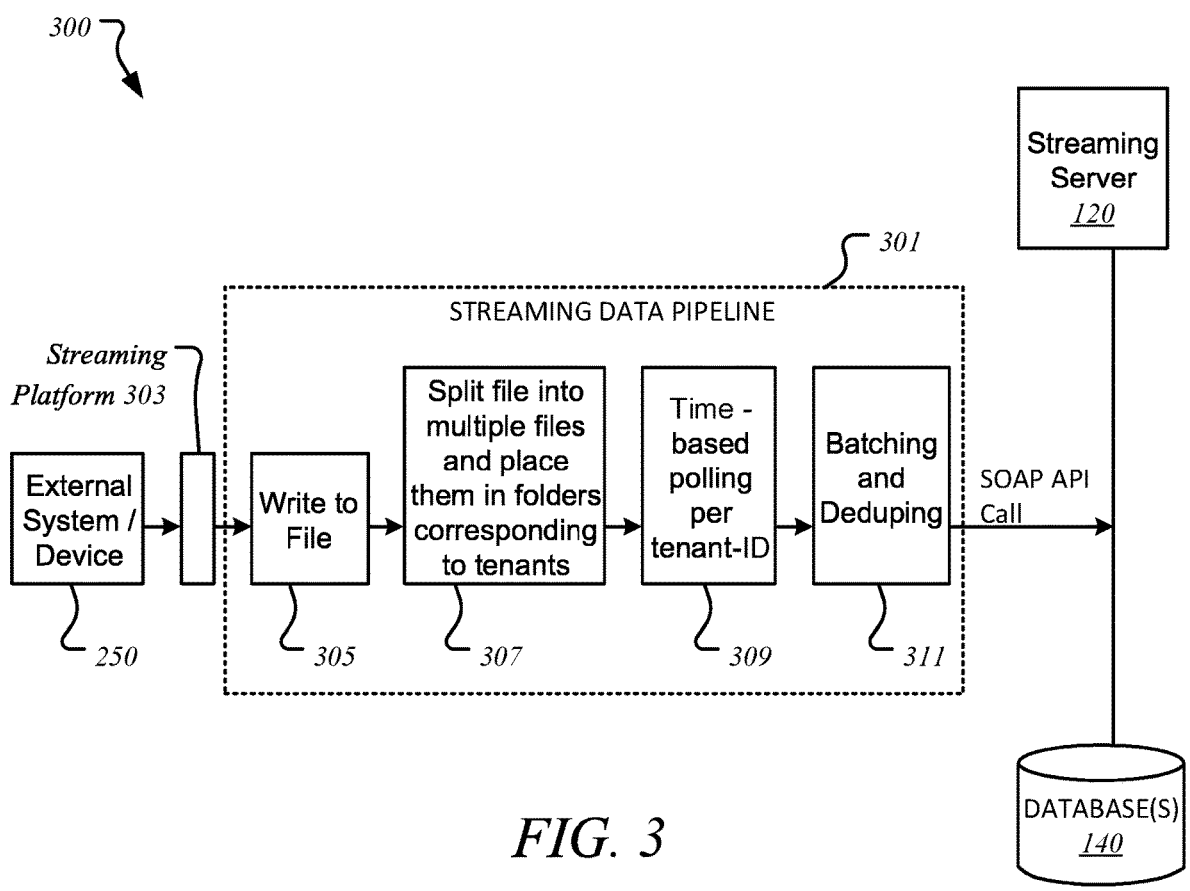
FIG. 3 illustrates a transaction sequence for facilitating smart streaming communication of data between service providers and external systems through streaming data pipeline according to one embodiment.

FIG. 3 illustrates a transaction sequence 300 for facilitating smart streaming communication of data between service providers and external systems through streaming data pipeline 301 according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by one or more components of streaming mechanism 110 of FIG. 1. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

In the illustrated embodiment, transaction sequence 300 begins at external system 250 (e.g., SalesforceIQ™) with computation of intelligence fields that are then sent over through streaming platform 303 (e.g., Apache® Kafka™) so that the intelligence fields may be used with their corresponding messages or records as they relate to tenants before being communicated over to a service provider (e.g., Salesforce.com®) by uploaded to streaming server 120 using an API, such as SOAP API.

In one embodiment, as illustrated, once the intelligence fields computed by external system 250 are received at streaming data pipeline 301 as facilitated by detection and evaluation logic 213 of FIG. 2, these intelligence fields are then written to a file (e.g., Avro file) at 305. At 307, as previously discussed with reference to FIG. 2, this file may get bigger and bigger over time and upon reaching a criterion, such as time limit, content limit, etc., the file may then be split as facilitated by splitting and grouping logic 217 and then re-grouped into smaller files corresponding to their tenants and put into tenant-specific folders. In other words, a big file that contains data relating to multiple tenants is broken down into smaller files such that each file includes data corresponding to a single tenant.

At 309, time-based polling of the folders and their contents is performed using tenant-IDs based on a timer set to predetermined time criteria as set forth by criteria and decision logic 215. Further, at 311, criteria and decision logic 215 facilitates deduping such that any duplication of data is eliminated either through merging of duplicates with the original or simply removing of duplicates all together. Further, at 311, a batch of files is put together and, as facilitated by streaming/routing logic 219, the batch is uploaded on communicated on to one or more database(s) 140 through calling SOAP APIs and as facilitated by communication/compatibility logic 207 and streamer server 120.

As discussed earlier with reference to FIG. 2, streaming data pipeline 301 spans and works across CRM and with external system 250, where external system 250 computes intelligence metric fields. This computed data including intelligence fields is written o files and queues at 305. These changes are grouped by tenant-ID in time-ordered manner at 309, while duplicating records are eliminated at 311. If any duplicating records remain, a SOAP call may throw an error.

In one embodiment, messages from data pipeline 301 are consumed and written to files at 305. As a file grows over a given time period, T, and upon having a number of records, X, where both T and X are configurable, the file is split at 307. In one embodiment, T and X are used to keep the file from growing too big with records when sending from external system 250 to streaming server and the associated database(s) 140 over streaming data pipeline 301.

In one embodiment, for each tenant, a directory is generated on a file system and this directory having files including records associated with a tenant allows for reading of messages, records, etc., as identified through a tenant-ID associated with the tenant. These records are written to folders at 307 and that are continued on until uploaded to database(s) 140 as facilitated by streaming server 120. Once all messages are processed and writing to tenant-specific folders at 307, any duplicates are detected and eliminated (such as through merging of identical records) at 311. This final file is then uploaded to database(s) 140 using an API call, such as a SOAP call.

This novel technique allows for significant reduction in network traffic and resources by making fewer number of SOAP API calls, while ensuring the data is sent or uploaded in time-ordered manner to allow for a consistent view of the system for users. Further, using this approach, tenant-specific records are batched together in a single SOAP call, while eliminating duplicate record and, in turn, reducing the overall number of records. This also allows for saving of network bandwidth and reducing of overall number of SOAP calls made by the tenants so that the tenants do not breach their API call limits. Further, this way, users can view intelligence fields in a time-ordered manner having consistent view of the system offered by the service provider, while batching record updates at 311 ensure that tenants API call limits are not reached.

Figure 4:
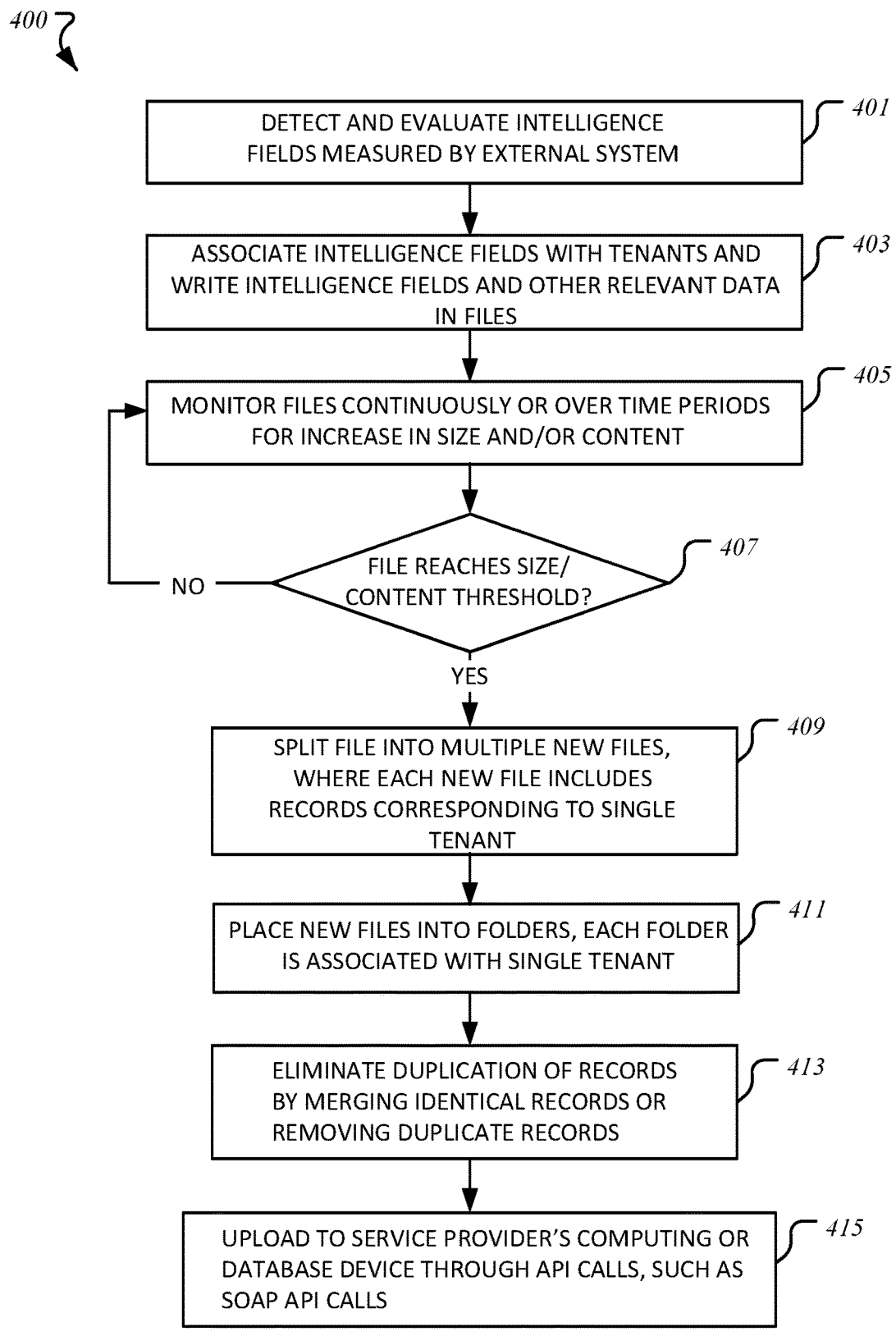
FIG. 4 illustrates a method for facilitating smart streaming communication of data between service providers and external systems through streaming data pipeline according to one embodiment.

FIG. 4 illustrates a method 400 for facilitating smart streaming communication of data between service providers and external systems through a streaming data pipeline according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of streaming mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at block 401 with detection and evaluation of initial data, such as intelligence fields, measured by an external system (e.g., SalesforceIQ™, etc.). At block 403, these intelligence fields are then associated with messages or records corresponding to tenants in a multi-tenant environment and written to files. At block 405, the files are monitored continuously or over a predetermined time period (such as every few seconds) for both their size and content. At block 407, a determination is made as to whether a file has gotten to big (in size or content) for further processing, including communication of its contents to a service provider (e.g., Salesforce.com®) associated with the external system, where the maximum threshold level for size and content are provided by or based on predetermined criteria.

If the file's size and content are still manageable, such as still below the predetermined threshold, method 400 may then continue monitoring of the file at block 405. If, however, at block 409, the file has gotten too big for size or content, such as the size or contents have exceeded the predetermined threshold, then the file is split in multiple parts based on messages/records corresponding to tenants, such as each part includes overall records (e.g., messages, intelligence fields, etc.) associated with a single tenant. In one embodiment, the correspondence of messes/records with their tenants may be determined or established using intelligence fields and tenant-IDs. For example, each tenant is assigned a unique tenant-ID and intelligence fields, which can be used to determine their corresponding messages or records.

At block 411, each part is shaped or grouped into a new file having the overall records corresponding to a single tenant (as identified by tenant-ID) such that multiple parts are now multiple files, where each file is placed in a folder corresponding to a tenant. At block 413, any duplication of records in files is eliminated by either merging the identical records or simply removing duplicate records from the files. At block 415, the folders are uploaded or communicated on to a computing device (e.g., streaming server computer) or one or more databases associated with the service provider, such as through calling SOAP API. By uploading these folders corresponding to single tenants, this novel technique also allows for keeping the SOAP API calls under threshold call limits.

Figure 5:
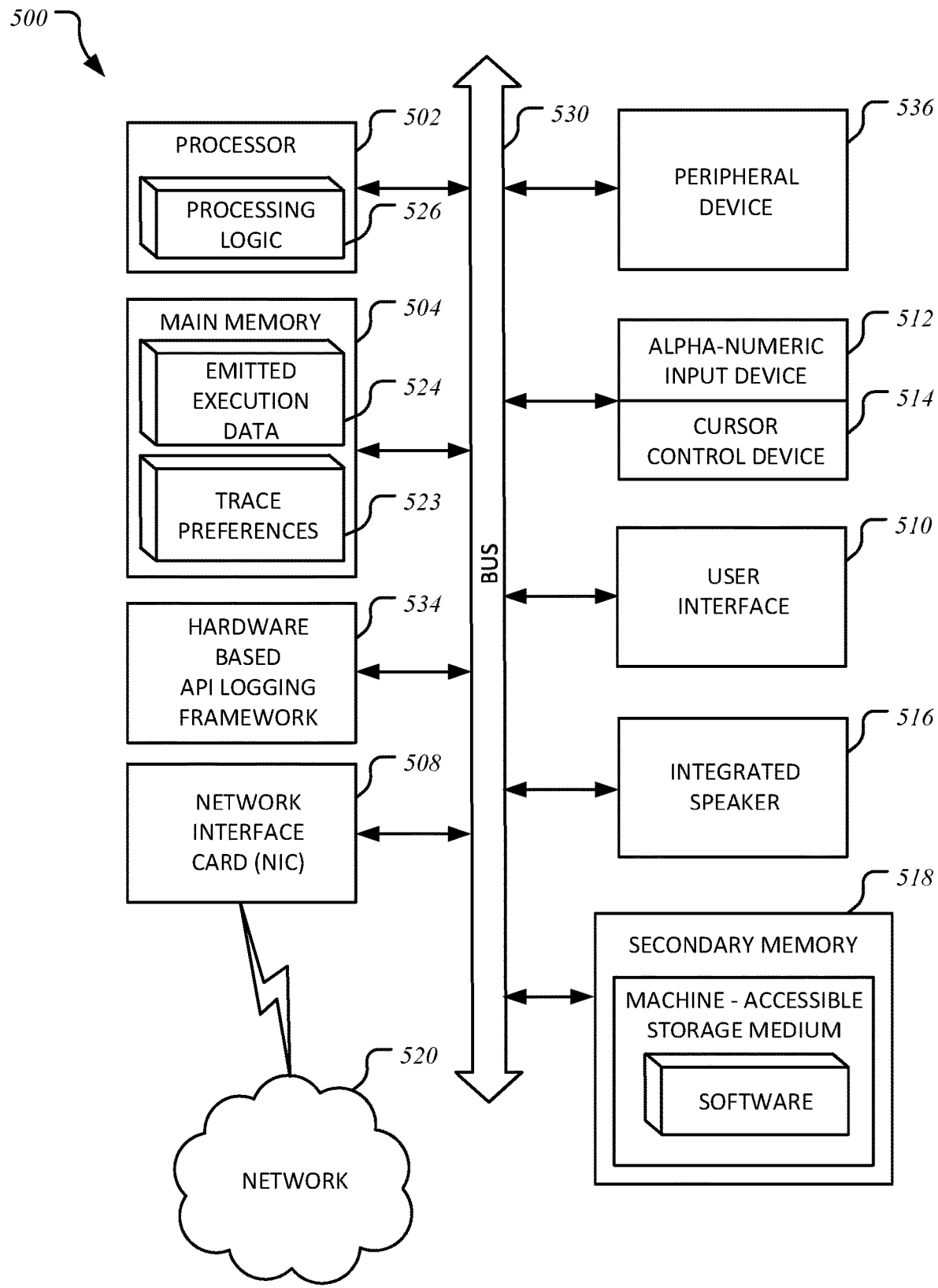
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of query mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of query mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
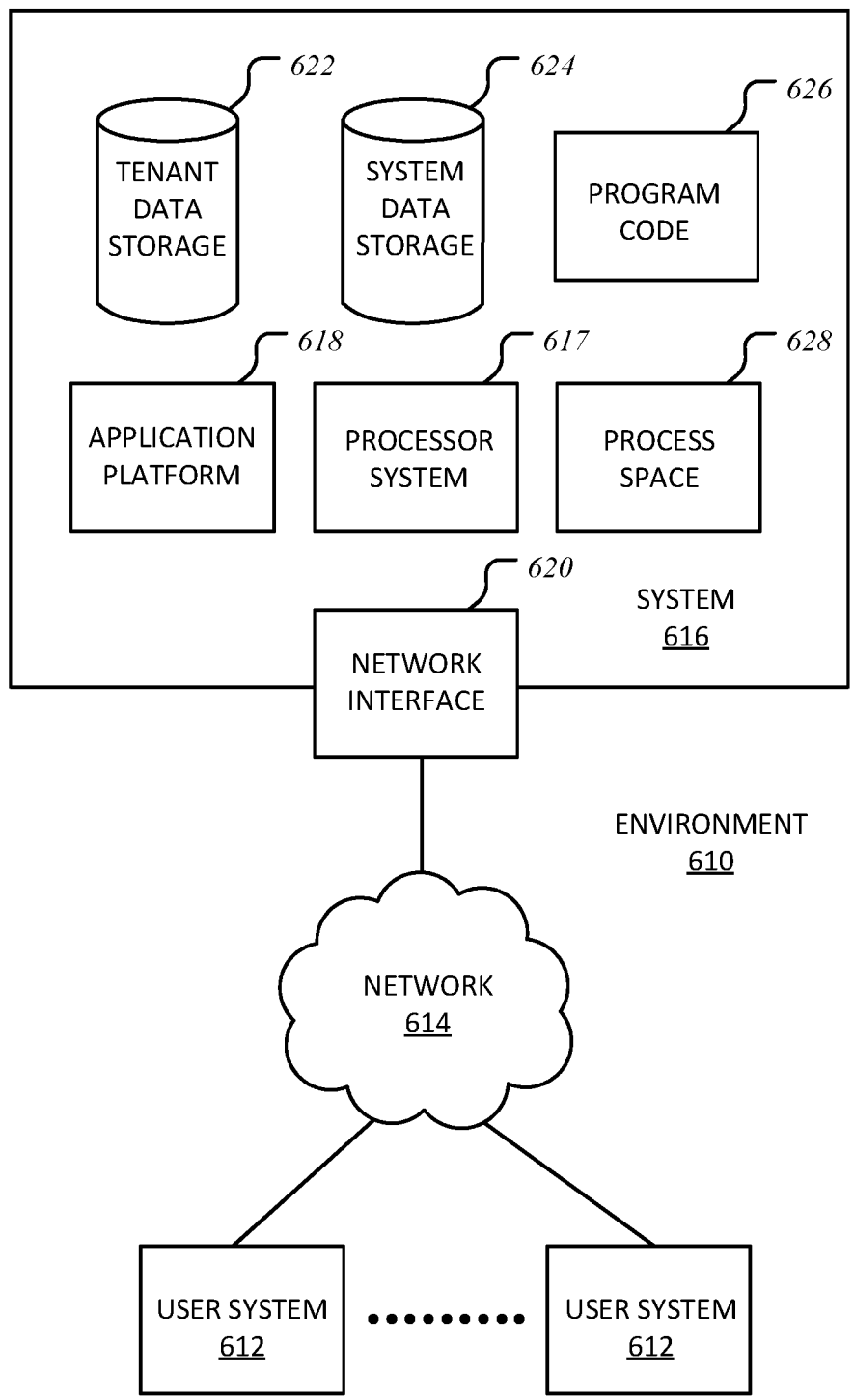
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
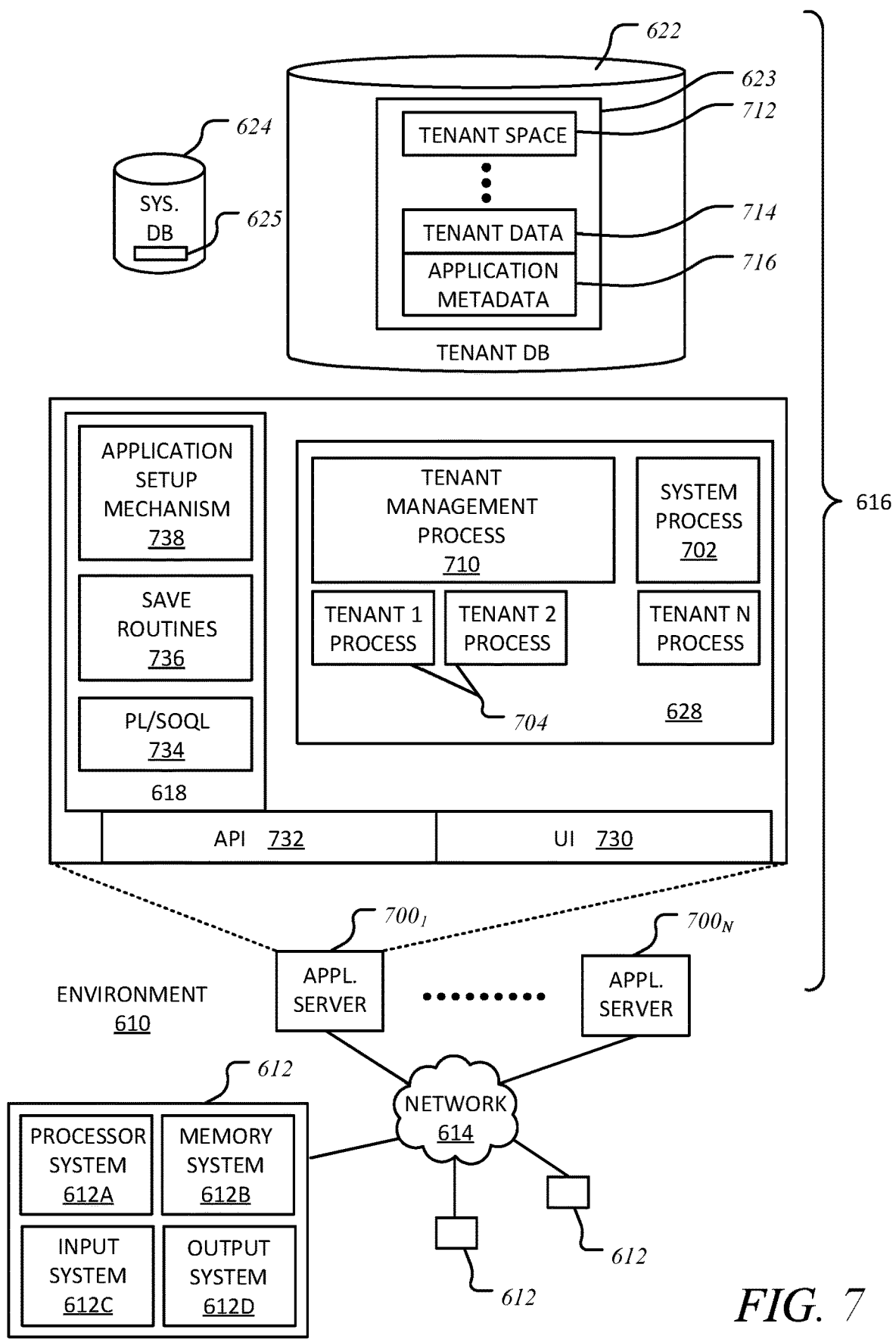
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
monitoring, by a streaming device, a file over a time-period for detecting growth of the file over the time-period, the file having messages corresponding to tenants in a multi-tenant environment;
splitting, by the streaming device, the file into multiple files based on the growth of the file, wherein the growth represents increase in contents of the messages over the time-period such that the file is split into the multiple files when the growth has reached a growth threshold;
grouping, by the streaming device, the messages into the multiple files based on intelligence fields associated with one or more of the messages and the tenants, wherein each file of the multiple files corresponds to a tenant;
eliminating one or more content duplications from the one or more messages of the multiple files by (1) removing the one or more content duplications or (2) merging the one or more messages with one or more identical messages without the one or more content duplications;
uploading, by the streaming device, the multiple files to a database; and
communicating, by the streaming device, the multiple files to one or more computing devices via the database.

2. The method of claim 1, wherein the intelligence fields are computed by an external system and communicated on to the service provider using a streaming data pipeline as facilitated by the streaming server device.

3. The method of claim 1, further comprising evaluating, by the streaming device, the multiple files for detecting the one or more duplications in the one or more messages of the multiple files.

4. The method of claim 1, further comprising placing, streaming device, the multiple files in multiple folders prior to uploading to the database device, wherein each of the multiple folders corresponds to a tenant of the multiple tenants.

5. The method of claim 1, wherein uploading is facilitated through one or more calls comprising Simple Object Access Protocol (SOAP) API calls such that the one or more calls are within a plurality of calls allocated to the multiple tenants.

6. A database system comprising:
a streaming device including a processing device coupled to a storage device, the processing device to execute instructions to facilitate operations comprising:
monitoring a file over a time-period for detecting growth of the file over the time-period, the file having messages corresponding to tenants in a multi-tenant environment;

splitting the file into multiple files based on the growth of the file, wherein the growth represents increase in contents of the messages over the time-period such that the file is split into the multiple files when the growth has reached a growth threshold;

grouping the messages into the multiple files based on intelligence fields associated with one or more of the messages and the tenants, wherein each file of the multiple files corresponds to a tenant;

eliminating one or more content duplications from the one or more messages of the multiple files by (1) removing the one or more content duplications or (2) merging the one or more messages with one or more identical messages without the one or more content duplications;

uploading the multiple files to a database; and communicating the multiple files to one or more computing devices via the database.

7. The system of claim 6, wherein the intelligence fields are computed by an external system and communicated on to the service provider using a streaming data pipeline as facilitated by the streaming server device.

8. The system of claim 6, wherein the operations further comprise evaluating, by the streaming device, the multiple files for detecting the one or more duplications in the one or more messages of the multiple files.

9. The system of claim 6, wherein the operations further comprise placing the multiple files in multiple folders prior to uploading to the database device, wherein each of the multiple folders corresponds to a tenant of the multiple tenants.

10. The system of claim 6, wherein uploading is facilitated through one or more calls comprising Simple Object Access Protocol (SOAP) API calls such that the one or more calls are within a plurality of calls allocated to the multiple tenants.

11. A non-transitory machine-readable medium having stored thereon instructions which, when executed by a processing device, cause the processing device to perform operations comprising:

monitoring a file over a time-period for detecting growth of the file over the time-period, the file having messages corresponding to tenants in a multi-tenant environment;

splitting the file into multiple files based on the growth of the file, wherein the growth represents increase in contents of the messages over the time-period such that the file is split into the multiple files when the growth has reached a growth threshold;

grouping the messages into the multiple files based on intelligence fields associated with one or more of the messages and the tenants, wherein each file of the multiple files corresponds to a tenant;

eliminating one or more content duplications from the one or more messages of the multiple files by (1) removing the one or more content duplications or (2) merging the one or more messages with one or more identical messages without the one or more content duplications;

uploading the multiple files to a database; and communicating the multiple files to one or more computing devices via the database.

12. The non-transitory machine-readable medium of claim 11, wherein the intelligence fields are computed by an external system and communicated on to the service provider using a streaming data pipeline as facilitated by the streaming server device.

13. The non-transitory machine-readable medium of claim 11, wherein the operations further comprise evaluating, by the streaming device, the multiple files for detecting the one or more duplications in the one or more messages of the multiple files.

14. The non-transitory machine-readable medium of claim 11, wherein the operations further comprise placing the multiple files in multiple folders prior to uploading to the database device, wherein each of the multiple folders corresponds to a tenant of the multiple tenants.

15. The non-transitory machine-readable medium of claim 11, wherein uploading is facilitated through one or more calls comprising Simple Object Access Protocol (SOAP) API calls such that the one or more calls are within a plurality of calls allocated to the multiple tenants.

* * * * *